United States Patent Office 3,493,591
Patented Feb. 3, 1970

3,493,591
PREPARATION OF PALLADIUM-π-ALLYL COMPLEXES
Arthur D. Ketley, Silver Spring, Md., assignor to W. R. Grace & Co., New York, N.Y., a corporation of Connecticut
No Drawing. Filed Dec. 26, 1967, Ser. No. 693,170
Int. Cl. C07j 15/00
U.S. Cl. 260—429   5 Claims

ABSTRACT OF THE DISCLOSURE

In abstract, this invention is directed to a process for preparing a palladium-π-allyl complex by reacting a palladium(II) salt-nitrile complex having the formula $$PdX_2(RCN)_2$$

where X is a chloride, bromide, iodide, acetate, or formate ion, and R is an alkyl group having 1–4 carbon atoms with a monoolefin boiling at about 125–300° C. while maintaining the temperature of the resulting mixture at about 125–250° C. for about 5–360 minutes; crystallizing the thus formed palladium-π-allyl complex by cooling said second mixture to about 0–110° C.; and separating and recovering the palladium-π-allyl complex all as recited hereinafter.

---

This invention is in the field of π-allyl complexes, especially the preparation of palladium-π-allyl complexes.

In the prior art, π-allyl complexes, including those of palladium, have been prepared by reacting metal halides with allyl Grignard reagents. A review of π-allyl complexes is presented by Wilke et al. in Angewandte Chemie, International Edition, vol. 5, No. 2 (February 1966), pages 151–166.

In summary, this invention is directed to a process for preparing a palladium-π-allyl complex, said process comprising; (a) reacting a palladium(II) salt-nitrile complex, said palladium(II) salt-nitrile complex having the formula $PdX_2(RCN)_2$ where X is selected from the group consisting of chloride, bromide, iodide, acetate, and formate ions and R is an alkyl group having 1–4 carbon atoms with a stoichiometric excess of a monoolefin, said olefin having a boiling point of about 125–300° C. for about 5–360 minutes; (b) crystallizing the thus formed palladium-π-allyl complex by cooling said second mixture to about 0–110° C.; and (c) separating and recovering said palladium-π-allyl complex.

In preferred embodiments of the process described in the above summary:
(1) The palladium(II) salt-nitrile complex is $$PdCl_2(CH_3CN)_2$$

and
(2) The olefin is selected from the group consisting of allyl benzene, α-methylstyrene, p-nitro-α-methylstyrene, p-methoxy-α-methylstyrene, 2-cyclohexylpropene, vinylnaphthalene, and dodecene.

In another preferred embodiment (Embodiment A) this invention is directed to a process for preparing a palladium-π-allyl complex, said process comprising:
(a) forming a complex of palladium(II) salt, said salt being selected from the group consisting of palladium(II) chloride, palladium(II) bromide, palladium(II) iodide, palladium(II) acetate, and palladium(II) formate and a nitrile, said nitrile having the formula RCN where R is an alkyl group having 1–4 carbon atoms, by: (i) blending a palladium(II) salt selected from the aforesaid group with a stoichiometric excess of said nitrile in a first reaction zone while maintaining the temperature of the resulting first mixture within the range of about 0°–100° C. for about 10–60 minutes; and (ii) vaporizing excess nitrile from the thus formed palladium(II) salt-nitrile complex;

(b) forming said palladium-π-allyl complex by; (i) forming a second mixture by blending said palladium(II) salt-nitrile complex with a stoichiometric excess of an olefin, said olefin having a boiling point of about 125–300° C. in a second reaction zone (which can be the same flask or other reactor which constituted the first reaction zone in step (a), supra) while maintaining the temperature of the resulting second mixture within the range of about 125°–250° C. for about 5–360 minutes; and (ii) crystallizing the thus formed palladium-π-allyl complex by cooling said second mixture to about 0°–100° C.; and (c) separating and recovering said palladium-π-allyl complex.

In preferred embodiments of the process described in Embodiment A, supra:
(1) The palladium salt is palladium(II) chloride;
(2) The nitrile is acetonitrile;
(3) The olefin is selected from the group consisting of allyl benzene, α-methylstyrene, p-nitro-α-methylstyrene, p-methylstyrene, 2-cyclohexylpropene, vinylnaphthalene, and dodecene;
(4) The first mixture is maintained at about 0–100° C. for about 15–30 minutes.
(5) The second mixture is maintained at about 125–250° C. for about 10–30 minutes.

It is an object of the present invention to provide a new and improved process for preparing palladium-π-allyl complexes.

It is another object of this invention to provide a method for preparing palladium-π-allyl complexes from palladium(II) salts, nitriles having the formula RCN, where R is an alkyl group having about 1–4 carbon atoms, and a monoolefin having a boiling point of about 125–300° C.

Other objects will, on the basis of the disclosures presented in this specification, be readily apparent to those skilled in the art.

In the process of this invention, because of the cost of palladium salts, I prefer when reacting a palladium(II) salt with a nitrile to form a complex of said salt and said nitrile to use a stoichiometric excess of the nitrile. While greater or larger excesses of nitrile have been used with excellent results, I generally prefer to use about 4–50 moles of said nitrile per mole of palladium salt. The stoichiometry of the reaction calls for 2 moles of nitrile per mole of palladium salt. Excellent results have also been obtained when using an excess of palladium(II) salt, but because of the cost of palladium salts and the work involved in recovering said excess (unreacted) palladium salt, I do not prefer to use an excess of palladium (II) salt. Excellent results have also been obtained when using stoichiometric quantities of a palladium(II) salt and nitrile, but I find it more convenient to use an excess of nitrile.

Also, for economic reasons, when reacting a complex of a palladium(II) salt and a nitrile with an olefin to form a palladium-π-allyl complex, I also prefer to use a stoichiometric excess of olefin. While greater and larger excesses of olefin have been used with excellent results, I generally prefer to use about 4–20 moles of olefin per mole of palladium(II) salt-nitrile complex. The stoichiometry of the reaction calls for 1 mole of olefin per mole of palladium(II) salt-nitrile complex. Excellent results have also been obtained where using; (a) an excess of a palladium(II) salt-nitrile complex; and (b) stoichiometric quantities of a palladium(II) salt-nitrile complex and an olefin, but, as stated supra, for economic reasons, because of the cost of palladium(II) salts I prefer to use an excess of olefin.

3,493,591

The following equations, using typical reactants, represent the reactions involved in the process of this invention:

$$PdCl_2 + 2CH_3CN = PdCl_2(CH_3CN)_2$$
(Palladium(II)  (Acetonitrile)  (Palladium(II) Chloride-Aceto-
 Chloride)                       nitrile Complex)

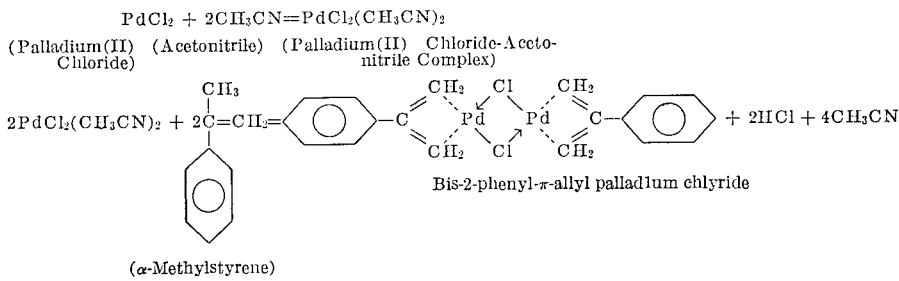

Bis-2-phenyl-π-allyl palladium chloride (α-Methylstyrene)

Palladium-π-allyl complexes, including such complexes prepared by the process of this invention are excellent catalysts for the polymerization of butadiene. See Example 8, infra. Also see pages 160–161 of Wilke et al. (cited supra).

The instant invention will be better understood by referring to the following specific but nonlimiting examples. It is understood that said invention is not limited to these examples which are offered merely as illustrations, and it is also understood that modifications can be made without departing from the spirit and scope of the invention.

Example 1

PdCl$_2$(CH$_3$CN)$_2$ was prepared by adding 0.01 mole (1.77 g.) of PdCl$_2$ to 0.20 mole (8.2 g.) of acetonitrile in a flask, heating the resulting mixture to about 40° C. for about 20 minutes, and evaporating the excess acetonitrile from the resulting PdCl$_2$(CH$_3$CN)$_2$ by applying vacuum to the flask containing the mixture of PdCl$_2$(CH$_3$CN)$_2$ and acetonitrile to reduce the pressure therein to about 20–30 mm. of mercury absolute and maintaining the system at said pressure while immersing the flask containing the PdCl$_2$(CH$_3$CN)$_2$ in an oil bath at about 40° C. until substantially all the unreacted acetonitrile was evaporated from the flask. The thus formed PdCl$_2$(CH$_3$CN)$_2$ was recovered. The yield was substantially quantitative.

Example 2

The general procedure of Example 1 was repeated, but in this instance the PdCl$_2$ was replaced by 0.01 mole of Pd(CH$_3$COO)$_2$, and the resulting Pd(CH$_3$COO)$_2$(CH$_3$CN)$_2$ was recovered. The yield was about 100% of theory.

Example 3

1 g. PdCl$_2$(CH$_3$CN)$_2$ was stirred with 25 ml. of p-fluoro-α-methylstyrene for 25 min. at 150°–153°. The hot solution was filtered. On standing, 0.5 g. of yellow crystals separated which were shown by elemental analysis and nuclear magnetic resonance (N.M.R.) to be:

Example 4

The general procedure of Example 3 was repeated, but in this instance the PdCl$_2$(CH$_3$CN)$_2$ was replaced with Pd(CH$_3$COO)$_2$(CH$_3$CN)$_2$ which had been prepared by reacting palladium (II) acetate and acetonitrile. The recovered product, identified by N.M.R. as

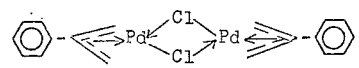

weighed 0.45 g.

Example 5

The general procedure of Example 3 was repeated, but in this instance the p-fluoro-α-methylstyrene was replaced with α-methylstyrene. A yield of 0.48 g. of

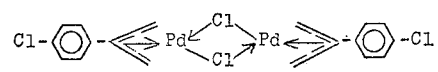

was obtained.

Example 6

The general procedure of Example 3 was repeated, but in this instance the p-fluoro-α-methylstyrene was replaced with p-chloro-α-methylstyrene. A yield of 0.52 g. of

was obtained.

Example 7

The general procedure of Example 3 was repeated, but in this instance the p-fluoro-α-methylstyrene was replaced with allylbenzene. A yield of 0.45 g. of

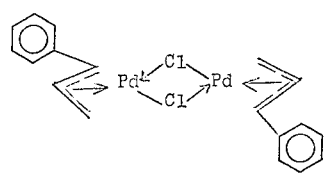

was obtained.

Example 8

A 1 gram portion of a palladium-π-allyl complex prepared by the procedure of Example 6, supra, from PdCl$_2$(CH$_3$CN)$_2$ and p-chloro-α-methylstyrene was dissolved in about 100 ml. of benzene and 1,3-butadiene was bubbled into the resulting solution for about 2 hours at the rate of about 20 g. per hour while maintaining the temperature of said solution at about 40–45° C. This treatment converted substantially all of the butadiene into a soft solid polymer. Said polymer was separated from the benzene solution of palladium-π-allyl complex and vulcanized by blending with sulfur and heating. The resulting vulcanized "rubber" was excellently adapted for use in making gaskets and for use as a material for sealing "tin" cans.

I claim:
1. A process for preparing a palladium-π-allyl complex, said process comprising:
  (a) forming a complex of a palladium(II) salt, said salt being selected from the group consisting of palladium(II) acetate and palladium(II) formate and a nitrile, said nitrile having the formula RCN where

R is an alkyl group having 1–4 carbon atoms, by; (i) blending a palladium(II) salt selected from the aforesaid group with a stoichiometric excess of said nitrile in a first reaction zone while maintaining the temperature of the resulting first mixture within the range of about 0°–100° C. for about 10–60 minutes; and (ii) vaporizing excess nitrile from the thus formed palladium(II) salt-nitrile complex;

(b) forming said palladium-π-allyl complex by; (i) forming a second mixture by blending said palladium (II) salt-nitrile complex with a stoichiometric excess of a monoolefin, said monoolefin having a boiling point of about 125–300° C. in a second reaction zone while maintaining the temperature of the resulting second mixture within the range of about 125–250° C. for about 5–360 minutes; and (ii) crystallizing the resulting palladium-π-allyl complex by cooling said second mixture to about 0–100° C.; and (c) separating and recovering said palladium-π-allyl complex.

2. The process of claim 1 in which the nitrile is acetonitrile.

3. The process of claim 1 in which the first mixture is maintained at about 0–100° C. for about 15–30 minutes.

4. The process of claim 1 in which the second mixture is maintained at a temperature of about 125–250° C. for about 10–30 minutes.

5. A process for preparing a palladium-π-allyl complex, said process comprising:

(a) forming a complex of a palladium(II) salt, said salt being selected from the group consisting of palladium(II) acetate and palladium(II) formate and a nitrile, said nitrile having the formula RCN where R is an alkyl group having 1–4 carbon atoms, by; (i) blending a palladium(II) salt selected from the aforesaid group with a stoichiometric excess of said nitrile in a first reaction zone while maintaining the temperature of the resulting first mixture within the range of about 0°–100° C. for about 10–60 minutes; and (ii) vaporizing excess nitrile from the thus formed palladium(II) salt-nitrile complex;

(b) forming said palladium-π-allyl complex by; (i) forming a second mixture by blending said palladium (II) salt-nitrile complex with a stoichiometric excess of a monoolefin selected from the group consisting of allyl benzene, α-methylstyrene, p-fluoro-α-methylstyrene, p-methoxy-α-methylstyrene, 2-cyclohexylpropene, vinylnaphthalene, and dodecene in a second reaction zone while maintaining the temperature of the resulting second mixture within the range of about 125°–250° C. for about 5–360 minutes; and (ii) crystallizing the resulting palladium-π-allyl complex by cooling said second mixture to about 0°–100° C.; and (c) separating and recovering said palladium-π-allyl complex.

References Cited

UNITED STATES PATENTS 3,369,035   2/1968   Schultz _____ 260—429

OTHER REFERENCES

Kharasch et al.: J. Am. Chem. Soc., 60 (1938), pp. 882–4.

Guy et al.: Advances in Inorganic and Radiochemistry, vol. IV (1962), Academic Press, New York, N.Y. pp. 97 and 114–117.

HELEN M. McCARTHY, Primary Examiner

A. P. DEMERS, Assistant Examiner

U.S. Cl. X.R.

260—943